July 4, 1939.  J. F. W. SCHULZE  2,164,950

PROCESS FOR FORMING AGGLOMERATES

Filed Oct. 20, 1937

INVENTOR,
JOHN F.W. SCHULZE, DECEASED,
BY HENRY L. SCHULZE, ADMX.

BY *Albert B. Briggs*
ATTORNEY.

Patented July 4, 1939

2,164,950

UNITED STATES PATENT OFFICE 2,164,950

PROCESS FOR FORMING AGGLOMERATES

John F. W. Schulze, deceased, late of Cleveland, Ohio, by Henry L. Schulze, administrator, Yonkers, N. Y., assignor to E. I. du Pont de Nemours & Company, Wilmington, Del., a corporation of Delaware Application October 20, 1937, Serial No. 169,978

9 Claims. (Cl. 75—3)

This invention relates to agglomerates of inert, non-plastic mineral materials, and is particularly directed to processes wherein a comminuted mineral admixed with a fluid is kneaded until plasticity is developed and wherein the plastic, kneaded mass is agglomerated by subjecting it to vacuum and extruding it thru a die.

The invention is particularly applicable to the production of agglomerates of comminuted materials that are not themselves plastic under ordinary conditions of temperature and pressure, that do not readily form a plastic mass when wetted with water, and that do not set with water to form solid coherent bodies as is, for instance, the case with cement, plaster of Paris, or other substances which solidify thru changes in their chemical composition.

Examples of materials which I can agglomerate, according to my invention, are, for instance, carbonaceous mineral fuels such as coal and coke, natural minerals such as phosphate rock, ground barytes, heavy metal ores such as iron ores, iron pyrites, zinc ores, also primary transformation products of heavy metal ores such as roasted zinc or iron sulfide ores, or by-products or intermediate products of metallurgical operation, such as flue dusts, refuse zinc oxide, crude zinc oxide for instance that produced in the Waelz process, and other such inert, non-plastic mineral materials.

This invention is also particularly applicable to producing agglomerates of mixtures of such metallurgical products, minerals, and ores with a carbonaceous fuel where in thermic operation an intimate distribution of the reduceable material and the carbonaceous material is desired, the smelting of metals, the obtention of elemental phosphorus from phosphate rock, in the preparation of blast furnace charges, in the production of agglomerates of coal brasses for roasting, and in other such relations.

It has heretofore been proposed to form agglomerates of non-plastic inert materials by mixing such minerals in finely divided form with adhesive compositions. The mixture of minerals and binders can then be formed into agglomerates.

Such agglomeration processes offer further by reason of the fact that relatively large quantities of adhesives are required to produce agglomerates of adequate strength. It is not commercially feasible to add greatly to the cost of agglomerates of inexpensive mineral materials, and the great binder cost has hindered the general adoption of agglomeration processes of this character.

Such agglomeration processes offer further disadvantages arising from the fact that it is difficult to form agglomerates with the mixtures of mineral material and adhesives. The non-plastic comminuted materials are still non-plastic after mixing an adhesive with them, and these non-plastic materials cannot readily be extruded thru a die in the way that plastic materials such as clay can be extruded.

When a non-plastic mixture of a mineral with an adhesive is forced thru a die the excessive pressures required to extrude these products will frequently cause a separation of the liquid and the solid phases, with the result that the adhesive is separated from the mineral material and the resulting agglomerate is weak.

A somewhat more successful technique termed roll-pressing has been developed for forming agglomerates of comminuted mineral materials mixed with adhesives. In this type of process the comminuted material is fed into a concavity on a roll. A second roll cooperates to form an agglomerate under pressure.

Roll-pressing has the disadvantage that a relatively dry mix must be used or the mix will stick to the rolls. The use of a dry and relatively non-adhesive mix as required for successful operation tends to produce weak agglomerates.

I have found that plasticity can be developed in non-plastic comminuted minerals by kneading the minerals with water and a plastic material, a wetting agent, or a binder, and that the resulting plastic mix can be agglomerated. The induced plasticity makes it possible to extrude the comminuted material thru a die, and by subjecting the material to a vacuum at the time of extrusion agglomerates which when dry have great strength and density are economically and readily obtainable.

By the use of the processes of this invention one may produce rugged, strong agglomerates at a smaller cost than similar products could be produced by prior art methods. If a binder or adhesive is used, smaller amounts, say one-half as much or less, are required to produce agglomerates of equal or greater strength. The processes of this invention also offer the advantage that the agglomerates are formed by extrusion, which permits wide variation in form of agglomerates produced, and permits great quantity of production with relatively simple and inexpensive apparatus.

To prepare a comminuted mineral material for the development of plasticity a small amount of water is added thereto. The total amount of water added to the mineral material does not exceed about forty to fifty per cent of the void spaces in the dry comminuted material. As will be pointed out hereinafter it is usually preferable to add water at several times during the course of the process. The amount of water used is very critical, and a variation of as little as three per cent in the water content at the end of the plasticizing operations produces products unsatisfactory for extrusion.

It is noted that I use an unusually large amount of water, the amount usually being about double that heretofore proposed. The use of such larger amounts of water speeds up preparation and expedites the production of a really plastic mass.

At the same time that water is added a binder may be added in solution or in suspension in the water used to moisten the comminuted material in conventional manner. Small amounts of such binding agents as glue, molasses, starch, adhesive starch derivatives, clay, and the like may be used. Such materials need only be used in very restricted amounts, it being possible, according to the procedures of this invention, to produce rugged agglomerates with much smaller amounts of binder than has customarily been employed.

The water solution or suspension of binder may have a wetting agent added thereto. Wetting agents reduce the time required to induce plasticity of moistened masses of comminuted mineral materials and their use shortens the preparation period.

As wetting agents suitable for addition to comminuted mineral materials I may particularly mention the so-called textile wetting agents, the aqueous solutions of which greatly increase the wettability and tintability of textile fibers. Many of these textile wetting agents contain a large carbon-hydrogen radical to which one or more $SO_3$—X groups are attached (in which X is hydrogen or a salt forming group), and it is among such compounds that I have found wetting agents most useful in the processes of this invention.

Among the wetting agents suitable for use in the processes of my invention I may also mention: alkyl naphthalene sulfonic acids and their water soluble salts, such as propyl, butyl, hexyl, benzyl naphthalene sulfonic acids and their water soluble salts such as the alkali metal, ammonium or amine salts; sulfonated petroleum oils, sulfonated terpenes, sulfonated rosin, sulfonated resins, sulfonated fatty substances, e. g., derived from vegetable or animal oils, among which sulfonated castor oil commonly called Turkey red oil is a convenient, commercially available product particularly useful in the performance of my invention; sulfonated esters or ethers of long chain alcohols such as for instance derivatives of acetyloctyl alcohol, stearo-glyceryl ether; sulfuric acid esters of long chain aliphatic alcohols such as the sulfuric acid esters of hexyl-, octyl-, decyl-, lauryl-, myristyl-, mesityl-, linoleyl- alcohols, etc.; these last two groups are commonly referred to as "sulfation" products of long chain aliphatic alcohols; also other derivatives of long chain fatty acids and alcohols, provided the latter do not react with the constituents of the mineral material to be agglomerated to form insoluble compounds.

Some adhesive materials are themselves possessed of some capillary activity and these are particularly efficacious for this reason. Sulfite cellulose waste, for instance, has both binding properties and wetting agent properties. As will be pointed out hereinafter, this material may very satisfactorily be used in various relations.

After water and suitable binders and, if desired, wetting agents, have been added to the comminuted mineral material it is subjected to a kneading operation to develop plasticity sufficient to permit extrusion of the material. The plasticity is developed by the combined forces of mixing and pressing, such as is obtained for instance in an edge runner mill.

During the kneading operation and the development of plasticity the water present with the comminuted material tends to displace gas films surrounding the solid particles being agglomerated, replacing the films of gas by films of solution. Moderate heat or vacuum aids in the displacement of the air or gas films and facilitates the development of plastic properties. The application of heat is especially desirable if a binder is used which would normally increase the viscosity of the liquid phase since the heat will tend to counteract the increase in viscosity. It will be understood that if heat is used care must be taken to avoid driving off moisture. Small amounts of moisture may of course be replaced by further additions of water.

After the comminuted material has developed plasticity it is extruded thru a die to form agglomerates. At the time of extrusion the now plastic mass is subjected to vacuum. I do not fully understand the reason for the effectiveness of vacuum at this stage of the process but the differences resulting from its use are most profound. The use of vacuum during the preparation is helpful as mentioned above, but it is not a substitute for vacuum during the extrusion.

It seems possible that the use of vacuum during the extrusion of the comminuted materials in which plasticity has been developed causes a more intense pressure to be applied to the agglomerate as it is extruded without, as has heretofore been the case, causing a separation of the liquid phase. Whatever the nature of the action resulting it is certain that by the use of vacuum a comminuted mineral having a developed plasticity may readily be extruded thru a die to produce agglomerates of greatly increased strength.

The agglomerated products produced have relatively great mechanical strength after they lose only a slight amount of moisture. After they are permitted to dry, the agglomerates become even stronger and may be handled and used in the usual way without substantial crumbling.

The processes of my invention may be better understood by reference to the following illustrative examples.

Example I

The material to be briquetted according to this example was a zinc furnace charge made up as follows:

|  | Per cent |
| --- | --- |
| Trail burner ore | 54.6 |
| Bituminous coal | 24.3 |
| Coke fines | 10.2 |
| Anthracite culm | 10.9 |

It will be observed that the zinc value in the mix designated "trail burner ore" is a zinc cinder obtained by roasting zinc sulfides.

One hundred pounds of the zinc furnace charge above described was mixed with nine per cent by weight of water and two per cent by weight of sulfite cellulose waste. The charge was worked in a chaser which had a pan three feet in diameter. The chaser was provided with a single muller twenty inches in diameter with a five inch face. The muller had a total weight of five hundred pounds. In operation the muller was driven around the pan at thirty-two revolutions per minute. The operation of kneading the charge in the chaser was continued for a total of eighty minutes.

At the beginning of the kneading operation the material was like sand. Then, after a time, it became more coherent and of dough-like consistency. After about sixty minutes of operation, the charge lost some of the gained dough-like consistency and began to crumple under the muller. At this point one-half per cent by weight of water was added. After this addition of water the material gradually became more plastic.

After seventy-five minutes of kneading, one per cent of water was added to make the mass more plastic and again at eighty minutes just before the discharge of the mass, another one per cent of water was added. After the last addition of water the mass was kneaded only enough to secure thorough mixing of the water. After the eighty minutes kneading, the material was ready for extrusion into briquettes.

The kneading operation increases the specific gravity of the charge and this increase must reach a maximum before the charge is ready for agglomeration. As a matter of fact, the maximum density is reached long before adequate plasticity to permit extrusion is attained. Under the conditions of this example, the specific gravity was found to be 2.08 after fifteen minutes of kneading. After thirty minutes the specific gravity was 2.17. Determinations then made at forty-five minutes, sixty minutes, and at eighty minutes gave a specific gravity of 2.28. The maximum specific gravity was reached, therefore, after about forty-five minutes of kneading. I find it desirable ordinarily to proceed as described, making determinations of specific gravity at fifteen minute intervals until duplicate determinations show that a maximum has been reached.

Figure 1:
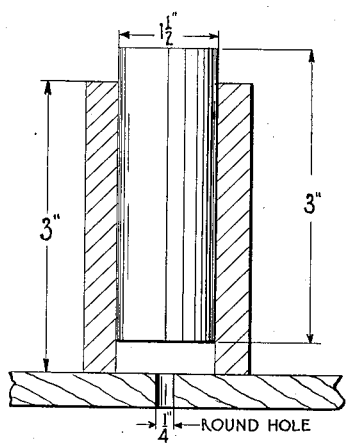
Figure 1 illustrates a testing apparatus used for determining plasticity.

The condition of the charge can be evaluated fairly well by inspection, but in order to determine whether or not a given charge is ready for extrusion, I have found it expedient to employ a testing device such as that shown in Figure 1 of the drawing. In employing this testing device, one hundred grams of the mix is put in the cylinder and the piston is placed over this charge. Pressure is applied to the cylinder as required so that the cylinder moves at a rate of 0.45 inch per minute and the mix is extruded thru the ¼" aperture at the bottom. This is continued until a final pressure of 3500 lbs. per square inch is reached, at which time the application of pressure is discontinued. The residual material which was not extruded is weighed, and the amount extruded as determined by difference is expressed as the per cent "extrudability" of the mix.

In the procedure above described, the extrudability was determined at intervals and the following results were obtained.

| Time | Extrudability |
| --- | --- |
|  | Percent |
| 60 min. (before adding water) | 0 |
| 60 min. (after adding water) | 0 |
| 75 min. (before adding water) | 0 |
| 75 min. (after adding water and mixing) | 40 |
| 80 min. (after adding water and mixing) | 60 |

The charge could have been extruded after adding water at the end of 75 minutes with 40 per cent extrudability, but the somewhat higher extrudability obtained at the end of eighty minutes with a further addition of water made the material much more easily handled.

Figure 2:
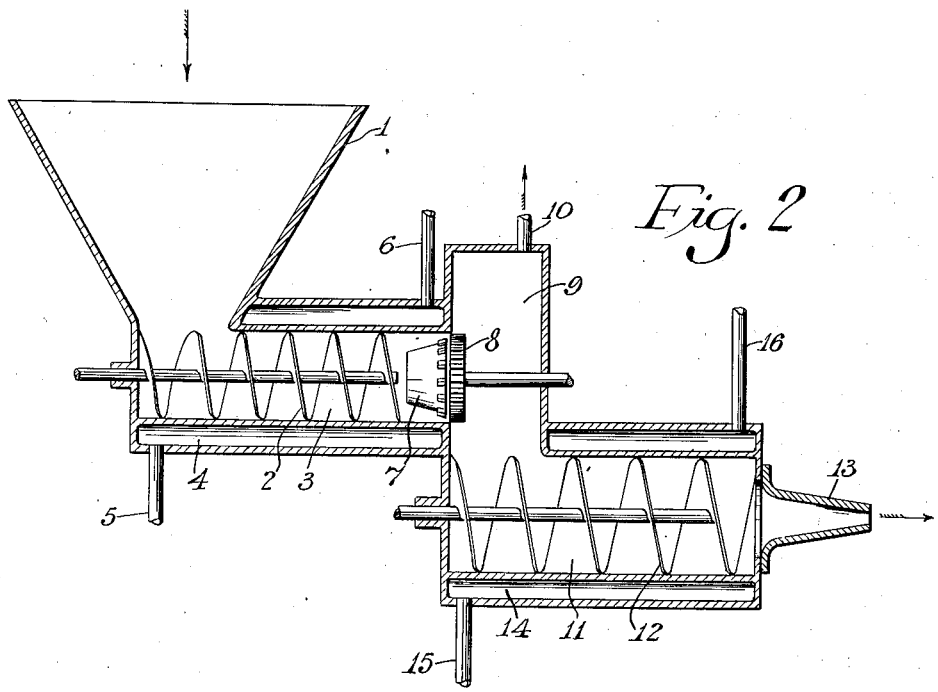
Figure 2 illustrates an apparatus suitable for use in my processes for the vacuum extrusion of comminuted mineral materials.

The kneaded and plasticized charge prepared as above described was placed in an apparatus such as that shown in Figure 2 of the drawing, and vacuum extruded into briquettes two inches in diameter.

The apparatus shown in the drawing is very similar to apparatus used for the extrusion of clay. The apparatus as illustrated includes a hopper 1 for receiving the material. Material is moved from the hopper by screw conveyor 2 operating within a chamber 3. The chamber is jacketed forming a space for a heating or cooling medium at 4. Suitable inlet and outlet means are provided at 5 and 6 for circulation of a heating or cooling medium. The use of this heating jacket is particularly advantageous when the charge to be agglomerated contains a thermoplastic binder, since by the application of heat the charge may be more easily worked.

A plug 7 is provided at the end of the passage 3. The plug is stationary and is spaced from the walls of the passage by fingers, or lugs, thru which the charge passes into the vacuum chamber at 9. A shredder 8 operates to cut off portions of the charge as they are extruded thru the openings between the plug 7 and the wall of the chamber 3. It will be understood that the function of this plug is to effect a sealing aided by the material passing around it so that a vacuum may be maintained in the chamber 9. A suitable outlet means 10 connects to a pump not shown which serves to maintain a vacuum in the chamber 9 and within the lower chamber at 11. This means of applying vacuum has heretofore been found useful in the extrusion of clay forms and other true plastics, since by the use of vacuum these may be made more homogeneous.

The charge after falling to the bottom of the chamber 9 into the chamber 11 is carried along by a screw conveyor at 12, and is finally extruded thru a nozzle 13. It will be observed that this nozzle is not of the type ordinarily used for the extrusion of clay and other true plastics, since mineral materials may not be greatly compressed without rupturing the film of moisture which imparts the apparent plasticity which they possess. As shown, the nozzle has walls which are substantially parallel, the contraction given to the material being very slight. With clay or a similar material the nozzle would be of more markedly frusto-conical form.

The chamber 11 is provided with a heating jacket at 14 and is provided with inlet and outlet pipe at 15 and 16 for the admission and circulation of a heating or cooling medium.

The charge prepared as above was extruded at a vacuum of 28" of mercury. The product as extruded had a specific gravity before drying of 2.28. The briquette was dried at a temperature of 230° F. for about six hours and 12% of water, on a dry weight basis, was lost.

The product obtained was quite rugged and was of entirely satisfactory strength for use as a zinc furnace charge. By the use of only 2% sulfite cellulose liquor as above, a product was obtained which was the equal of products heretofore made by prior art procedures using from 5 to 8% of sulfite cellulose liquor.

For the determination of the approximate strength of the briquettes, a rattler test was used. In this test a cylindrical drum 15" in diameter by 15" long and having a single 2½" angle fastened to its inner wall parallel to its axis was rotated at a speed of 500 revolutions in 12 minutes. Briquettes to be tested as to their strength were placed in this drum and the drum rotated for either six minutes, 250 revolutions, or for 12 minutes, 500 revolutions, the longer test being more severe and showing a greater difference in superior products. The rattler strength is expressed hereafter as the per cent of briquette retained in a 1" mesh.

The briquettes made according to the process of this example showed a rattler strength of 90% on a six minute test, and a rattler strength of 81% on a twelve minute test.

The effectiveness of the use of vacuum in the above procedure was evidenced by a similar procedure which simply extruded the plastic kneaded mass without the use of vacuum. When this was done the rattler strength on a six minute test was only 86%, and on a twelve minute test was only 41%.

The importance of using the vacuum during the extrusion rather than simply at some other point in the process was shown by the fact that a process such as that above described was performed using vacuum during the preparation but extruding without the use of vacuum. Briquettes made in this manner gave a rattler strength of 75% on a six minute test and of 36% on a twelve minute test.

A procedure similar to that above was followed using 8% water and 3% by weight of sulfite cellulose liquor. This charge was worked for ninety minutes. Water was added at sixty minutes, 1%, and at ninety minutes, 0.33%. The final extrudability was 53%. The product was vacuum extruded and the wet product had a specific gravity of 2.28. The moisture loss on drying was 11.9%. The rattler strength on a six minute test was 93%, and on a twelve minute test was 86%. The use of a larger quantity of sulfite cellulose liquor produces a somewhat stronger briquette than the use of 2%, but the briquettes obtained with 2% of the sulfite cellulose liquor are stronger than they need to be, and the use of the larger amount is not justified. As small an amount as one per cent or even less can be used to advantage to produce somewhat weaker briquettes.

Example II

A mixture of comminuted minerals suitable for a zinc furnace charge such as that shown in the above example was mixed with 4% of water and 3% by weight of sulfite cellulose waste. The mixture was kneaded in a first chaser and then in a second chaser. On leaving the first chaser the moisture content was 5.6% by reason of the necessary addition of water during the chasing operation, and the extrudability was zero. As the charge left the second chaser, the moisture content was 8.6% and the extrudability zero. The kneaded mass was then charged into a pug mill and mixed with additional water. When the charge left the pug mill, the moisture content was 12.4% and the extrudability 50%. The plastic, dough-like mass was extruded under vacuum as in the above Example I producing briquettes with a specific gravity of 2.24 and a moisture content of 11.6%. The briquettes were oven dried at 230° F. and in a rattler test gave a rattler strength of 90% in a six minute test and 75% in a twelve minute test.

By the use of chasers, the density required in the agglomerate was quickly developed using a minimum amount of water. It was then found most practical to use a pug mill for the final addition of water and final development of plasticity as chasers will not operate to the best advantage with a mix wet enough for the development of plasticity. The wet mix is, of course, readily handled by the pug mill.

Example III

A mixture of comminuted materials as shown in Example I was mixed with 10% by weight of water, 1% by weight of sulfite cellulose waste liquor, and 2% by weight of Missouri clay. The mix was worked in a chaser, as in Example I, for a total of sixty-five minutes. At the end of thirty minutes 0.5% of water was added and at sixty minutes 0.25% of water was added. At the end of the sixty-five minute period of working, the plasticized mass showed an extrudability of 51%. A part of the batch was vacuum extruded giving briquettes with a specific gravity of 2.27. These were dried at a temperature of 230° F. with a moisture loss of 12.1%. The briquettes were strong and sound, and on a six minute rattler test showed a strength of 89%, and on a twelve minute rattler test showed a strength of 78%.

The balance of the batch was worked for an additional twenty minutes with 0.6% additional water added at the end of a total of eighty minutes of working. The final extrudability was 73%. The mass was extruded under vacuum, producing a product with a specific gravity, wet, of 2.25. The product was dried at 230° F. with a moisture loss of 11.9%. The briquettes obtained were cracked and on a six-minute rattler test showed a strength of 85% and on a twelve minute rattler test showed a strength of 69%.

It will be seen that very high extrudabilities are not desirable since the product is likely to crack. In general it is desirable to develop only as great a plasticity as is required to permit vacuum extrusion. The plasticity must, of course, be great enough that the fluid films surrounding the particles of comminuted material and being responsible for the plasticity will not be ruptured by the pressure required to extrude the material.

It will be observed that clay was used as a binder in addition to the sulfite cellulose liquor. Besides acting as a binder, the clay being itself a true plastic promotes plasticity in the comminuted mineral materials and shortens the time required for satisfactory preparation.

Clay may satisfactorily be used alone as a binder. A zinc furnace mix was made up using 3% of Missouri plastic clay and 11% of water. The batch was worked on a chaser for sixty minutes. At the end of forty-five minutes of working, a 1% addition of water was made. The final product before extrusion had an extrudability of 48%. A part of the batch was extruded under a vacuum of twenty-seven inches of mercury. The product had a specific gravity while wet of 2.24. After drying at 230° F. the product had a rattler strength at six minutes of 82% and at twelve minutes of 38%. The unused portion of the batch was extruded without vacuum, producing briquettes with a specific gravity of 2.15. After drying at 230° F. the briquettes had a rattler strength at six minutes of 58% and at twelve minutes of 11%.

*Example IV*

A zinc furnace mix was made up with the following constituents:

|  | Per cent |
|---|---|
| Trail burner ore | 53.5 |
| Bituminous coal | 29.2 |
| Anthracite culm | 5.3 |
| Coke fines | 10.0 |

To the comminuted material was added 8% by weight of water which contained 2% by weight of sulfite liquor (based on the weight of mineral) and 2% by weight of Missouri clay (also based on the weight of mineral).

The mix was prepared by repeated extrusion on an apparatus such as that shown in Figure 2 of the drawing. The nozzle 13 was replaced by a somewhat larger nozzle, and smaller nozzles were used as the mass became more plastic. The vacuum on the chamber 9 varied from about fifteen to about twenty-seven inches of mercury, the maximum being reached on the final extrusion. The following tabulation shows the water content and extrudability as determined at the end of each pass.

| Pass No. | Water | Extrudability |
|---|---|---|
|  | Percent | Percent |
| 1 | 13.1 | 27 |
| 2 | 13.1 | 48 |
| 3 | 12.7 | 54 |
| 4 | 13.1 | 62 |
| 5 | 12.7 | 66 |

The two-inch diameter briquettes produced in the final pass had a specific gravity when wet of 2.20. These were dried and showed a rattler strength in a three minute test of 91%, in a six minute test of 81%, and in a twelve minute test of 49%.

The preparation of the mix by repeated extrusion is not as satisfactory as a preparation using chasers or a preparation using chasers and a pug mill. The mix must be kept rather wet to permit extrusion, and maximum density can be developed only by prolonged working.

*Example V*

The zinc furnace mix used in this example was composed of the following comminuted mineral materials:

|  | Per cent |
|---|---|
| Trail burner ore | 55 |
| Bituminous coal | 30 |
| Coke fines | 10 |
| Anthracite culm | 5 |

To the comminuted mineral materials was added 10% of water, 2% of sulfite cellulose waste liquor, and 0.01% of Turkey red oil. The mixture was worked for one hundred minutes in a five-gallon heavy duty dough mixer equipped with masticating agitators. About 1% of water was added during preparation. The final product discharged from the dough mixer was relatively dry, and 3% of water was added before extrusion. The product before extrusion had an extrudability of 46%. The batch was vacuum extruded producing two-inch briquettes with a specific gravity of 2.21 while wet. The briquettes were dried with a moisture loss of 13.6%. The briquettes showed a rattler strength at one minute of 97%, at three minutes of 91%, at six minutes of 81%, and at twelve minutes of 53%.

The use of the wetting agent, Turkey red oil, expedites the plasticizing operation and shortens the time of working. A dough mixer is not as satisfactory as a chaser for the kneading of comminuted mineral materials, but quite satisfactory briquettes can be made by its use.

*Example VI*

A zinc furnace mix included the following comminuted mineral materials:

|  | Per cent |
|---|---|
| Trail burner ore | 55 |
| Bituminous coal | 30 |
| Anthracite culm | 5 |
| Coke fines | 10 |

To the comminuted minerals was added 2% sulfite cellulose liquor, 0.09% Turkey red oil, 2% Missouri clay, and 16% water. About 550 lbs. of the mixture was charged into a twenty-two inch diameter vertical pug mill. The batch was re-cycled thru the pug mill for about two hours with addition of water as required to permit working. The following extrudabilities were obtained at the indicated times.

|  | Per cent |  | Per cent |
|---|---|---|---|
| 60 minutes | 21.3 | 105 minutes | 38.3 |
| 75 minutes | 29.8 | 120 minutes | 51.1 |
| 90 minutes | 27.7 |  |  |

The final material was vacuum extruded and dried with a moisture loss of 12.7%. The briquettes showed a rattler strength of 87% at six minutes and 72% at twelve minutes.

*Example VII*

A zinc furnace mix such as that shown in Example I was used. The mixture of comminuted minerals was mixed with 8% of water and 3% of molasses. The batch was worked for one hundred thirty-five minutes in a chaser such as that described in Example I, water being added as follows:

|  | Per cent |  | Per cent |
|---|---|---|---|
| 30 minutes | 1 | 110 minutes | 0.5 |
| 60 minutes | 1 | 120 minutes | 0.5 |
| 90 minutes | 1 | 135 minutes | 0.5 |
| 105 minutes | 1 |  |  |

The final extrudability of the product was 68%, but despite the high extrudability vacuum extrusion was difficult. The specific gravity of the product while wet was 2.26. The briquettes were dried at 230° F. with a moisture loss of 11.7%. The rattler strength at six minutes was 87% and at twelve minutes was 69%.

*Example VIII*

A batch of agglomerated comminuted materials was made up as in the above Example VII including 8% of water, 3% of molasses and, in addition, 0.05% of a sulfation product of a commercial mixture of higher aliphatic alcohols containing mostly decyl alcohol. The batch was worked in a chaser for ninety-five minutes with water addition being made as follows:

| Per cent | | Per cent |
|---|---|---|
| 30 minutes _____ 0.5 | | 75 minutes _____ 0.5 |
| 45 minutes _____ 0.5 | | 90 minutes _____ 1.0 |
| 60 minutes _____ 0.5 | | |

The final extrudability of the product was 69%. A portion of the batch was vacuum extruded producing briquettes with a specific gravity of 2.26. These were dried at 230° F. with a moisture loss of 11.4%. The briquettes had a rattler strength at six minutes of 87% and at twelve minutes of 74%.

The balance of the batch was extruded without the use of vacuum. The specific gravity of the briquettes produced was 2.20. After drying at 230° F. the briquettes had a rattler strength at six minutes of 91% and at twelve minutes of 49%.

It will be seen that the preparation time was considerably diminished by the use of a wetting agent and it will also be seen that the use of vacuum during extrusion produces a markedly more rugged briquette.

*Example IX*

A zinc furnace charge of comminuted mineral material such as that shown in Example I was mixed with 10% of water and 0.5% of Turkey red oil in a chaser. The working was continued for a total of one hundred twenty minutes, water additions being made as follows:

| | Per cent |
|---|---|
| 30 minutes _____ | 1.0 |
| 60 minutes _____ | 0.38 |
| 120 minutes _____ | 1.12 |

The final extrudability of the batch was 57%. The batch was vacuum extruded, producing a product, wet, having a specific gravity of 2.28. The product was dried at 230° F. with a moisture loss of 12.9%. The dry briquettes had a rattler strength at six minutes of 84% and at twelve minutes of 35%.

A similar batch was made but using 0.1% of Turkey red oil and 8% of water. The batch was worked for a total of one hundred twenty minutes in a chaser and further water additions were made as follows:

| Per cent | | Per cent |
|---|---|---|
| 30 minutes _____ 2.0 | | 90 minutes _____ 1.0 |
| 60 minutes _____ 1.0 | | 105 minutes _____ 0.5 |

The final extrudability of this batch was 50%. The product was vacuum extruded and the wet briquette had a specific gravity of 2.28. When dried the briquettes lost 14% of water and the dried product had a rattler strength of 68% on a six minute test.

*Example X*

A mixture of comminuted mineral materials such as that shown in Example I was mixed with 8% of water and 0.05% of sulfation product of a commercial mixture of higher aliphatic alcohols containing mostly decyl alcohol. The batch was worked in a chaser for one hundred twenty minutes with water additions as follows:

| Per cent | | Per cent |
|---|---|---|
| 15 minutes _____ 1.0 | | 90 minutes _____ 0.5 |
| 30 minutes _____ 1.0 | | 105 minutes _____ 1.0 |
| 45 minutes _____ 0.5 | | |

The final extrudability of the product was 52%.

The product was vacuum extruded into two-inch diameter briquettes three inches long which had a specific gravity of 2.27. These were dried at 230° F. with a loss of water of 13.4%. The product showed a rattler strength of 47% on a six minute test.

While the sulfation product functions primarily as a wetting agent, it will be seen that it also acts to give briquette strength. If only moderate briquette strength is required it may sometimes be sufficient therefore to employ only a wetting agent.

*Example XI*

The comminuted mineral material to be formed into agglomerates according to this example was a finely divided high volatile West Virginia coal. The coal had 34% volatile matter, 57% fixed carbon, and 7.2% ash. The particle size of the coal is indicated by the following screen analysis:

| | Per cent |
|---|---|
| Thru 10-mesh, retained on 20-mesh _____ | 10 |
| Thru 20-mesh, retained on 40-mesh _____ | 25 |
| Thru 40-mesh, retained on 80-mesh _____ | 25 |
| Thru 80-mesh _____ | 40 |

To a batch of coal was added 23% by weight of water containing 2% by weight of sulfite cellulose waste liquor, 5% of peat, and 0.5% of Turkey red oil. The batch was given nineteen passes thru an extrusion machine, as was done in Example IV. The batch was then vacuum extruded. When the briquettes were dried, they showed a rattler strength of 77% at six minutes and 55% on a twelve minute test.

*Example XII*

A high volatile West Virginia coal such as that shown in Example XI was mixed with 24% by weight of water, 2% sulfite cellulose liquor, 5% of peat. The batch was given eight passes thru an extruder and finally vacuum extruded, dried, and given a rattler test. The strength of the briquette on a six minute rattler was 79% and on a twelve minute rattler was 43%.

*Example XIII*

Cleaned anthracite culm having about 12% ash was the comminuted material agglomerated according to this example. The particle size is indicated by the following screen analysis:

| | Per cent |
|---|---|
| Thru 10-mesh, retained on 20-mesh _____ | 10 |
| Thru 20-mesh, retained on 40-mesh _____ | 25 |
| Thru 40-mesh, retained on 80-mesh _____ | 25 |
| Thru 80-mesh _____ | 40 |

To the coal was added 18% of water, 3% sulfite cellulose liquor, and 1% of asphalt emulsified with 0.05% (of coal weight) of the sulfation product of a mixture of even numbered aliphatic alcohols having from eight to sixteen carbon atoms. The batch was given seventeen passes thru an extruder and the product was vacuum extruded finally into two-inch diameter briquettes which were dried at 230° F. The briquette showed a rattler strength in a six minute test of 89% and in a twelve minute test of 67%.

*Example XIV*

Cleaned anthracite culm such as that shown in Example XIII was mixed with 18% by weight of water, 3% of sulfite cellulose liquor, and 5% of Ohio peat. The batch was given seventeen passes thru an extruder and was finally extruded under vacuum. The dried product showed a rattler strength of 79% on a six minute test and 51% on a twelve minute test.

*Example XV*

Cleaned anthracite culm such as that shown in the preceding example was mixed with 16% by weight of water and 4% by weight of sulfite cellulose liquor. The batch was prepared by twenty-one passes thru an extruder. The batch was finally vacuum extruded to give two-inch diameter briquettes which were dried at 230° F. and rattled. The briquettes had a rattler strength of 89% on a six minute test and of 61% on a twelve minute test.

Similar briquettes were made using a raw anthracite culm. The uncleaned culm was more easily briquetted and required less sulfite liquor. Using 2% of sulfite cellulose waste liquor, a briquette was obtained having a rattler strength of 85% on a six minute test and 66% on a twelve minute test.

*Example XVI*

In this example an Ohio high volatile coal having the below-indicated particle sizes was used:

| | Per cent |
|---|---|
| Thru a 10-mesh, retained on 20-mesh | 10 |
| Thru a 20-mesh, retained on 40-mesh | 25 |
| Thru a 40-mesh, retained on 80-mesh | 25 |
| Thru an 80-mesh | 40 |

To the coal was added 25% by weight of water, 2% of sulfite cellulose waste liquor, and 5% of peat. The batch was given ten passes thru an extruder, not using vacuum. The batch became very plastic and extruded readily under vacuum for the production of briquettes. Briquettes were dried at 230° F. with a moisture loss of 24.5%. The briquettes had a strength of 69% on a six minute rattler test, and 35% on a twelve minute rattler test.

*Example XVII*

A coal like that of the preceding example was mixed with 20% by weight of water, 3% by weight of sulfite cellulose waste liquor and 2% of clay. The batch was given eight passes without the use of vacuum thru an extruder, more water being added as required. The final mix was very tough but plastic. This was vacuum extruded and the briquettes dried at 230° F. with a moisture loss of 26.8%. The briquettes had a rattler strength of 87% on a six minute test and 75% on a twelve minute test.

Whatever type of apparatus is employed for kneading and working the comminuted materials to develop plasticity, the working should be continued for a long enough time to develop maximum density if a product of the greatest strength is to be obtained. Ordinarily the density is obtained before plasticity develops and no particular attention need be given to this characteristic.

The plasticity developed should not greatly exceed that required to permit extrusion of the mass so that the fluid films of the plastic mass will not be ruptured by the pressure of extrusion. Generally an extrudability of about 40% is required for satisfactory extrusion in most well designed equipment. For continuous operation an extrudability of about 50% is preferable. An extrudability as high as about 60% may be required on apparatus employing a number of nozzles and requiring a considerable flow of the material.

As has been indicated in the foregoing, a vacuum must be applied during extrusion if a product of the most satisfactory characteristics is to be obtained. The vacuum used during extrusion may be widely varied, tho as high a vacuum as is permissible with the apparatus available would ordinarily be most suitable.

While I have shown a number of specific forms of apparatus and a number of specific processes in the foregoing, it will be understood that I do not intend to be limited thereto as one skilled in the art may readily devise numerous processes for obtaining a plasticity in a comminuted mineral material and then vacuum extrude it to produce briquettes of great strength.

This application is a continuation-in-part of my applications Serial Number 22,491 and Serial Number 22,492 filed May 20, 1935, the latter now being Patent No. 2,131,074, dated Sept. 27, 1938.

I claim:

1. In a process of producing agglomerates containing a comminuted zinciferous material, the steps comprising moistening the material with water, adding a binder, kneading the moistened mass until plasticity is developed, and forming agglomerates of the plastic kneaded mass by extruding it thru a die while subjecting it to a vacuum.

2. In a process of producing agglomerates of a comminuted material that is itself neither plastic nor capable of setting when moistened with water, the steps comprising moistening the material with water, adding a binder and a wetting agent, kneading the moistened mass until plasticity is developed, and forming agglomerates of the plastic kneaded mass by extruding it thru a die while subjecting it to a vacuum.

3. In a process of producing agglomerates containing a comminuted zinciferous material, the steps comprising moistening the material with water, adding a binder and a wetting agent, kneading the moistened mass until plasticity is developed, and forming agglomerates of the plastic kneaded mass by extruding it thru a die while subjecting it to a vacuum.

4. In a process of producing agglomerates of a comminuted material that is itself neither plastic nor capable of setting when moistened with water, the steps comprising moistening the material with water, adding a binder and clay, kneading the moistened mass until plasticity is developed, and forming agglomerates of the plastic kneaded mass by extruding it thru a die while subjecting it to a vacuum.

5. In a process of producing agglomerates containing a comminuted zinciferous material, the steps comprising moistening the material with water, adding a binder and clay, kneading the moistened mass until plasticity is developed, and forming agglomerates of the plastic kneaded mass by extruding it thru a die while subjecting it to a vacuum.

6. In a process of producing agglomerates of a comminuted material that is itself neither plastic nor capable of setting when moistened with water, the steps comprising moistening the material with water, adding a binder, kneading the moistened mass until it reaches a maximum density and until not substantially less than about forty per cent of a one-hundred gram sample is extrudable thru a one-quarter inch hole at the bottom of a one and one-half inch cylinder at a rate of 0.45 inch per minute with a final pressure attained of 3,500 pounds per square inch, and forming agglomerates of the plastic kneaded mass by extruding it thru a die while subjecting it to a vacuum.

7. In a process of producing agglomerates containing a comminuted zinciferous material, the steps comprising moistening the material with water, adding a binder, kneading the moistened mass until it reaches a maximum density and until not substantially less than about forty per cent of a one-hundred gram sample is extrudable thru a one-quarter inch hole at the bottom of a one and one-half inch cylinder at a rate of 0.45 inch per minute with a final pressure attained of 3,500 pounds per square inch, and forming agglomerates of the plastic kneaded mass by extruding it thru a die while subjecting it to a vacuum.

8. In a process of producing agglomerates of a comminuted material that is itself neither plastic nor capable of setting when moistened with water, the steps comprising moistening the material with water, adding a binder, kneading the moistened mass until it reaches a maximum density and until not substantialy less than about fifty per cent of a one-hundred gram sample is extrudable thru a one-quarter inch hole at the bottom of a one and one-half inch cylinder at a rate of 0.45 inch per minute with a final pressure attained of 3,500 pounds per square inch, and forming agglomerates of the plastic kneaded mass by extruding it thru a die while subjecting it to a vacuum.

9. In a process of producing agglomerates containing a comminuted zinciferous material, the steps comprising moistening the material with water, adding a binder, kneading the moistened mass until it reaches a maximum density and until not substantially less than about fifty per cent of a one-hundred gram sample is extrudable thru a one-quarter inch hole at the bottom of a one and one-half inch cylinder at a rate of 0.45 inch per minute with a final pressure attained of 3,500 pounds per square inch and forming agglomerates of the plastic kneaded mass by extruding it thru a die while subjecting it to a vacuum.

HENRY L. SCHULZE,
*Administrator for the Estate of John F. W. Schulze, Deceased.*

CERTIFICATE OF CORRECTION.

Patent No. 2,164,950. July 4, 1939.

HENRY L. SCHULZE, ADMINISTRATOR
of JOHN F. W. SCHULZE, deceased.

It is hereby certified that error appears in the printed specification of the above numbered patent requiring correction as follows: Page 1, first column, line 49, for "Such agglomeration processes offer further" read Such processes are disadvantageous, however,; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.